United States Patent
Holzman

(10) Patent No.: US 10,054,918 B2
(45) Date of Patent: Aug. 21, 2018

(54) EMULATOR FOR OPTIMIZING ENERGY CONSUMPTION MANAGEMENT SYSTEMS

(71) Applicant: ENGIE Storage Services NA LLC, Santa Clara, CA (US)

(72) Inventor: Mathew Holzman, Redwood City, CA (US)

(73) Assignee: ENGIE STORAGE SERVICES NA LLC, Santa Clara, CA (US)

( * ) Notice: Subject to any disclaimer, the term of this patent is extended or adjusted under 35 U.S.C. 154(b) by 215 days.

(21) Appl. No.: 14/835,600

(22) Filed: Aug. 25, 2015

(65) Prior Publication Data

US 2017/0063083 A1    Mar. 2, 2017

(51) Int. Cl.
| | |
|---|---|
| G06F 19/00 | (2018.01) |
| G05B 15/02 | (2006.01) |
| H02J 3/14 | (2006.01) |

(52) U.S. Cl.
CPC ............... G05B 15/02 (2013.01); H02J 3/14 (2013.01); H02J 2003/146 (2013.01); Y02B 70/3225 (2013.01); Y04S 20/222 (2013.01); Y04S 20/224 (2013.01)

(58) Field of Classification Search
CPC combination set(s) only.
See application file for complete search history.

(56) References Cited

U.S. PATENT DOCUMENTS

| | | | |
|---|---|---|---|
| 5,798,633 A | 8/1998 | Larsen et al. | |
| 6,977,446 B2 | 12/2005 | MacKay | |
| 7,122,916 B2 | 10/2006 | Nguyen et al. | |
| 7,482,710 B2 | 1/2009 | Ichinose et al. | |
| 7,873,441 B2 | 7/2011 | Synesiou et al. | |
| 8,761,952 B2 | 6/2014 | Forbes, Jr. | |

(Continued)

FOREIGN PATENT DOCUMENTS

| | | |
|---|---|---|
| WO | 2017035258 A1 | 3/2017 |
| WO | 2017040586 A1 | 3/2017 |

(Continued)

OTHER PUBLICATIONS

PCT International Search Report for corresponding PCT International Patent Application No. PCT/US2016/048448, dated Nov. 18, 2016.

*Primary Examiner* — Kidest Bahta
(74) *Attorney, Agent, or Firm* — Dorsey & Whitney LLP

(57) ABSTRACT

A process for calculating feasibility of an electrical energy consumption management system (CMS) includes receiving a first historical energy consumption profile of an energy consumer for a first time period and a second historical energy consumption profile of the energy consumer for a second time period, wherein the second time period is after the first time period. The process may also include determining a setpoint for a CMS, wherein the CMS has hardware specifications, and wherein the setpoint is based on the first historical energy consumption profile and the hardware specifications. Next, an energy savings that would be produced by the CMS over the second time period is determined and a feasibility rating is assigned to the CMS based on the first energy savings and the first hardware specifications. A customer may thereby determine or optimize the effectiveness of a CMS at his site before it is purchased and installed.

18 Claims, 6 Drawing Sheets

(56) References Cited

U.S. PATENT DOCUMENTS

| | | |
|---|---|---|
| 8,912,672 B2 | 12/2014 | Pendray et al. |
| 8,983,673 B2 | 3/2015 | Chow |
| 9,002,670 B2 | 4/2015 | Hurri et al. |
| 9,003,216 B2 | 4/2015 | Sankar et al. |
| 9,007,027 B2 | 4/2015 | Prosser |
| 9,048,671 B2 | 6/2015 | Prosser |
| 9,235,825 B2 | 1/2016 | Shao |
| 2003/0041016 A1 | 2/2003 | Spool et al. |
| 2008/0172312 A1 | 7/2008 | Synesiou et al. |
| 2011/0208369 A1 | 8/2011 | Yang et al. |
| 2012/0010757 A1 | 1/2012 | Francino et al. |
| 2012/0029720 A1 | 2/2012 | Cherian et al. |
| 2012/0130556 A1 | 5/2012 | Marhoefer |
| 2012/0242148 A1 | 9/2012 | Galati |
| 2012/0245744 A1 | 9/2012 | Prosser et al. |
| 2012/0310416 A1* | 12/2012 | Tepper .................. G05B 15/00 700/276 |
| 2013/0018821 A1 | 1/2013 | Shao |
| 2013/0030590 A1 | 1/2013 | Prosser |
| 2013/0117004 A1 | 5/2013 | Schultz et al. |
| 2013/0232151 A1 | 9/2013 | Shao |
| 2013/0271083 A1 | 10/2013 | Williams |
| 2014/0067140 A1* | 3/2014 | Gow ...................... G06Q 50/06 700/291 |
| 2014/0074306 A1 | 3/2014 | Lu et al. |
| 2014/0152007 A1 | 6/2014 | Sterregaard et al. |
| 2015/0295449 A1 | 10/2015 | Prosser |
| 2016/0006245 A1 | 1/2016 | Chow |
| 2016/0161932 A1 | 6/2016 | Shao |
| 2017/0060162 A1 | 3/2017 | Holzman et al. |
| 2017/0063083 A1 | 3/2017 | Holzman |
| 2017/0098229 A1 | 4/2017 | Vickery et al. |
| 2017/0098279 A1 | 4/2017 | Vickery et al. |
| 2017/0099056 A1 | 4/2017 | Vickery et al. |

FOREIGN PATENT DOCUMENTS

| | | |
|---|---|---|
| WO | 2017059340 A1 | 4/2017 |
| WO | 2017059345 A1 | 4/2017 |
| WO | 2017059350 A1 | 4/2017 |

\* cited by examiner

EMULATOR FOR OPTIMIZING ENERGY CONSUMPTION MANAGEMENT SYSTEMS

TECHNICAL FIELD

The present disclosure generally relates to energy and power consumption management systems and methods for selecting and optimizing those systems.

BACKGROUND

In recent years, utility customers have become more conscious of their power consumption. As their average consumption has increased, loads on electricity distribution grids have likewise grown. Utility providers must provide power to these increased loads by increasing production capacity or by more intelligently managing the consumption of consumers with incentive programs, pricing schedules, and related concepts.

Load on the grid fluctuates over the course of a day. Because it is expensive for utility providers to provide high power levels for short periods of time, utilities often define certain times of the day as "peak" periods and "off-peak" periods and then charge customers more for electricity consumed during the peak periods. Utilities have also charged customers with "peak demand charges" that are not based primarily on the time of day, but are instead are assessed at a value proportional to the magnitude of the highest peak in power consumption (e.g., in kilowatts (kW)) that the customer incurs during a period of time, such as over the course of a billing period. Peak demand charges can be a substantial burden, especially for customers that use devices and appliances that draw high power loads over short periods of time. For example, peak demand charges are especially high for businesses and residences that have electric vehicle (EV) charging stations, large freezers, machinery, or large heating, ventilation, and air conditioning (HVAC) units.

Consumers have sought ways to limit and control their peak demand charges, including by implementing devices and software for controlling the timing and power levels of operation of their electricity consuming devices (i.e., load shedding) and/or providing energy to the consumer from alternate sources (e.g., storage batteries, fuel cells, or generators) when metered power levels exceed a predetermined "setpoint" value. Each of these systems may be generically referred to as a consumption management system (CMS) since they manage the consumption of the electricity customer. In one example CMS, a high-capacity battery is connected to the site via a high-power inverter. A computer system monitors the metered power consumption of the customer and detects when the power levels reach the customer's setpoint, such as when a brief spike or peak in consumption occurs that would result in an increased demand charge for the customer. In response, the CMS allows the site to draw energy from the battery via the inverter to supplement or supplant the utility grid connection. The net consumption is measured at the utility meter, rather than the actual consumption, so the utility provider detects a lower peak consumption than would otherwise be registered. A lower registered peak corresponds with a lower peak demand charge for that billing period, provided that the consumption of the site does not spike above the setpoint for the rest of the billing period without being mitigated by the CMS.

A large-capacity CMS is expensive for most customers, so the CMS is usually designed with lower specifications to reduce costs. If the CMS costs far more than the money it would save in peak demand charges, it is typically not desirable to the customer. Further complications may also arise because the performance of a given CMS may be difficult to predict. Load prediction algorithms have been devised to help the CMS decide when and how much to charge or discharge the battery, but they are imperfect due to uncertainty in when and how large spikes or peaks in consumption may occur. In some cases, the performance of a CMS may not be known until after it has already been implemented and purchased by the customer. Thus, the overall cost and uncertainty in results limits the adoption rate of these systems despite their potentially great benefits to consumers.

Accordingly, there is a need for improvements in the methods and systems used for determining the feasibility and optimal implementation of consumption management systems.

SUMMARY

One aspect of the present disclosure relates to a process for calculating feasibility of an electrical energy consumption management system for an energy consumer. This process may comprise receiving a first historical energy consumption profile of an energy consumer for a first time period and a second historical energy consumption profile of the energy consumer for a second time period. The second time period may be after the first time period. The process may also include determining a first setpoint for a first consumption management system, wherein the first consumption management system has first hardware specifications. The first setpoint may be based on the first historical energy consumption profile and the first hardware specifications. The process may also include determining a first energy savings that would be produced by the first consumption management system over the second time period using the first setpoint and assigning a first feasibility rating to the first consumption management system based on the first energy savings and the first hardware specifications.

The first feasibility rating may comprise a ratio of the first energy savings to the first hardware specifications. The first hardware specifications may comprise a cost of the first consumption management system and the first energy savings may comprise a value of energy saved by operation of the first consumption management system over the second time period.

Determining a first energy savings may comprise emulating operation of the first consumption management system over the second time period using the second historical energy consumption profile and determining a reduction in energy usage over the second time period under emulated operation of the first consumption management system.

In some embodiments the process may further comprise determining whether the first feasibility rating is within a target range of feasibility ratings, and, responsive to determining that the first feasibility rating is within the target range, implementing the first consumption management system for the energy consumer.

The process may also further comprise determining a second setpoint for a second consumption management system, wherein the second management system has second hardware specifications, and wherein the second setpoint is based on the first historical energy consumption profile and the second hardware specifications; determining a second energy savings that would be produced by the second consumption management system over the second time period using the second setpoint; assigning a second feasibility rating to the second consumption management system based on the second energy savings and the second hardware specifications; and selecting the first or second consumption management system based on which of the first and second feasibility ratings is nearer to a predetermined target value. This process may also comprise determining whether the selected first or second consumption management system has a selected-system feasibility rating within a target range of feasibility ratings, and, responsive to determining that the selected-system feasibility rating is within the target range, implementing the selected consumption management system for the energy consumer.

In some embodiments the process may include, responsive to determining that the selected-system feasibility rating is not within the target range, changing the first hardware specifications. The first hardware specifications may comprise at least one of: an energy storage capacity and a power conversion capacity.

Another aspect of the disclosure relates to a computing device configured for calculating feasibility of an electrical energy consumption management system for an energy consumer. The computing device may comprise a processor and memory in electronic communication with the processor. The memory may store computer executable instructions that, when executed by the processor, cause the processor to perform the steps of: receiving a first historical energy consumption profile of an energy consumer for a first time period and a second historical energy consumption profile of the energy consumer for a second time period (the second time period being after the first time period); determining a first setpoint for a first consumption management system, wherein the first consumption management system has first hardware specifications, and wherein the first setpoint is based on the first historical energy consumption profile and the first hardware specifications; determining a first energy savings that would be produced by the first consumption management system over the second time period using the first setpoint; and assigning a first feasibility rating to the first consumption management system based on the first energy savings and the first hardware specifications.

The computer executable instructions may further comprise the steps of: determining a second setpoint for a second consumption management system, wherein the second management system has second hardware specifications, and wherein the second setpoint is based on the first historical energy consumption profile and the second hardware specifications; determining a second energy savings that would be produced by the second consumption management system over the second time period using the second setpoint; assigning a second feasibility rating to the second consumption management system based on the second energy savings and the second hardware specifications; and selecting the first or second consumption management system based on which of the first and second feasibility ratings is nearer to a predetermined target value.

The computer executable instructions may further comprise the steps of: determining whether the selected first or second consumption management system has a selected-system feasibility rating within a target range of feasibility ratings; and, responsive to determining that the selected-system feasibility rating is within the target range, implementing the selected consumption management system for the energy consumer.

The computer executable instructions may also further comprise, responsive to determining that the selected-system feasibility rating is not within the target range, changing the first hardware specifications. The first feasibility rating may comprise a ratio of the first energy savings to the first hardware specifications.

Yet another aspect of the disclosure relates to a non-transitory computer-readable storage medium storing computer executable instructions that, when executed by a processor, cause the processor to perform the steps of: receiving a first historical energy consumption profile of an energy consumer for a first time period and a second historical energy consumption profile of the energy consumer for a second time period (the second time period being after the first time period); determining a first setpoint for a first consumption management system, wherein the first consumption management system has first hardware specifications, and wherein the first setpoint is based on the first historical energy consumption profile and the first hardware specifications; determining a first energy savings that would be produced by the first consumption management system over the second time period using the first setpoint; and assigning a first feasibility rating to the first consumption management system based on the first energy savings and the first hardware specifications.

In some embodiments the computer executable instructions may further comprise determining a second setpoint for a second consumption management system, wherein the second management system has second hardware specifications, and wherein the second setpoint is based on the first historical energy consumption profile and the second hardware specifications; determining a second energy savings that would be produced by the second consumption management system over the second time period using the second setpoint; assigning a second feasibility rating to the second consumption management system based on the second energy savings and the second hardware specifications; and selecting the first or second consumption management system based on which of the first and second feasibility ratings is nearer to a predetermined target value.

The computer executable instructions may also further comprise determining whether the selected first or second consumption management system has a selected-system feasibility rating within a target range of feasibility ratings, and, responsive to determining that the selected-system feasibility rating is within the target range, implementing the selected consumption management system for the energy consumer.

Other embodiments may include computer executable instructions that further comprise, responsive to determining that the selected-system feasibility rating is not within the target range, changing the first hardware specifications. The first feasibility rating may comprise a ratio of the first energy savings to the first hardware specifications.

The above summary of the present invention is not intended to describe each embodiment or every implementation of the present invention. The Figures and the detailed description that follow more particularly exemplify one or more preferred embodiments.

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

Figure 1:
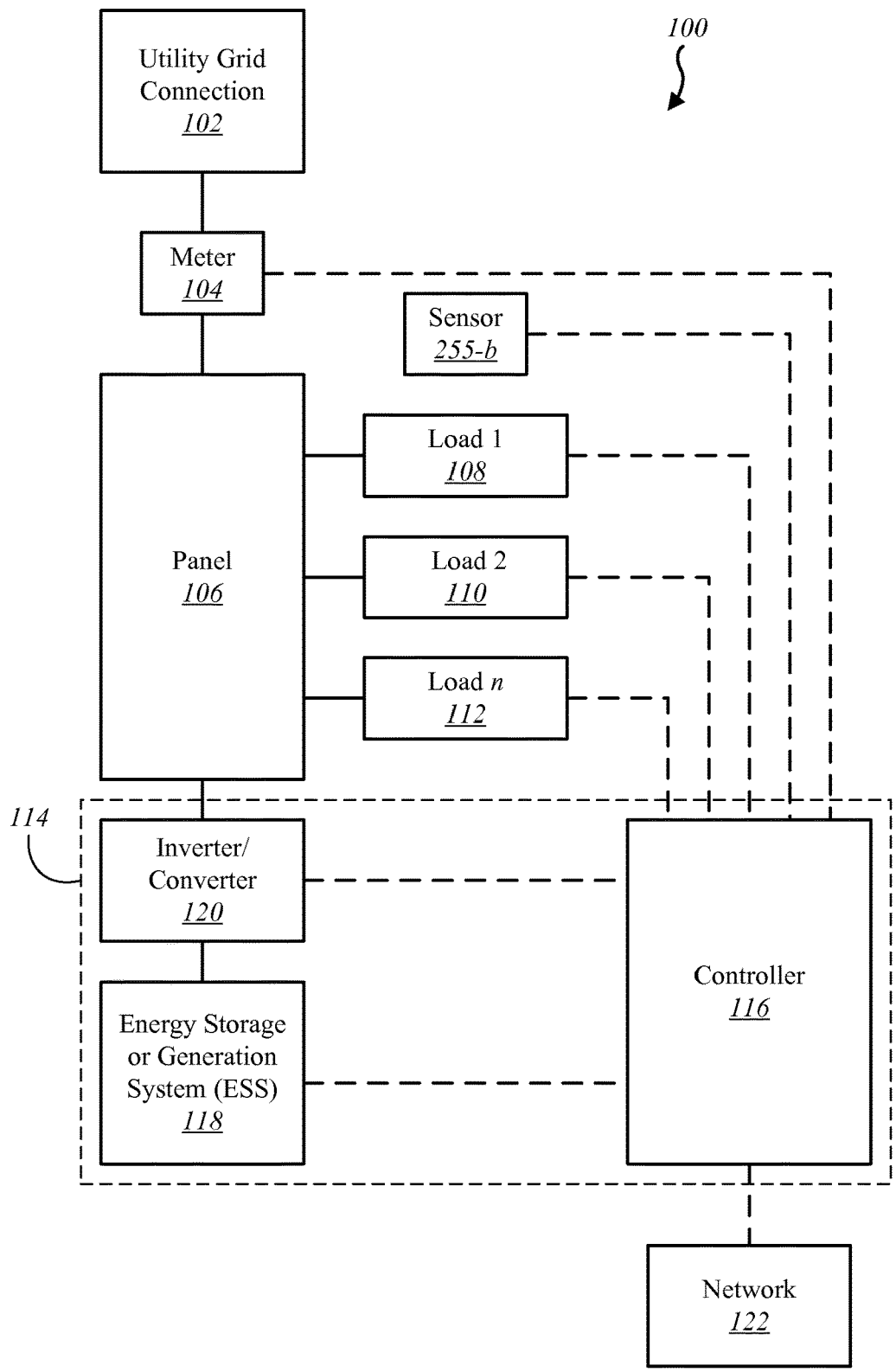
FIG. 1 is a block diagram of electrical components at a customer site according to an embodiment of the present disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The present disclosure generally relates to systems and methods for determining the feasibility and optimizing the implementation of a consumption management system (CMS) for a utility customer or consumer. Aspects of the present disclosure may be used to determine the likelihood that a certain CMS will be able to manage the consumption of a given site and help the customer determine which specifications of the CMS will produce cost-effective results. By emulating and predicting the performance of a power load leveling system (i.e., CMS), the customer may more readily identify an ideal amount of battery storage and/or inverter capacity to implement at the site in order to get a desired load leveling result.

An example process may include: (1) collecting power usage data for a site over a year (or some other time frame), (2) analyzing a portion of that power usage data, such as two weeks' worth of data, and deriving a setpoint for a CMS that has a given battery size and inverter size, then emulating operation of the CMS at that setpoint for a short time frame (e.g., three days), (3) analyzing the actual historically-recorded three days of data using the given CMS, (4) comparing the actual three-day result with the emulated three-day result, and (5) determining a feasibility rating of the CMS based on its efficiency and efficacy in managing consumption over the emulated period. The feasibility rating may be used to compare different CMS settings and configurations, such as different setpoints or different inverter capacities for a CMS to assess what kinds of changes to the design of the CMS will most improve the cost-effectiveness of the CMS while still catering to the needs of the customer.

Compared to traditional methods in determining CMS settings and specifications, the present systems and methods may reduce uncertainty and guesswork to allow a customer to implement a more customized CMS. The present systems and methods may also reduce a need for iterations of new CMS components being physically installed at the site since much of the processes may be simulated before implementation, and the historical data can provide feedback regarding the effectiveness of the simulated system without having to actually install the CMS and gather real-world data in real time.

The present description provides examples, and is not limiting of the scope, applicability, or configuration set forth in the claims. Thus, it will be understood that changes may be made in the function and arrangement of elements discussed without departing from the spirit and scope of the disclosure, and various embodiments may omit, substitute, or add other procedures or components as appropriate. For instance, the methods described may be performed in an order different from that described, and various steps may be added, omitted, or combined. Also, features described with respect to certain embodiments may be combined in other embodiments.

Referring now to the figures in detail, FIG. 1 shows a block diagram of an example customer site 100 according to an embodiment of the present disclosure. The customer site 100 may be connected to a utility grid connection 102 via a utility consumption meter 104. The meter 104 may be connected to a load panel 106 or other internal routing circuits of the site 100. Loads 108, 110, 112 of the site may be connected to the panel 106. The three loads 108, 110, 112 are representative of all loads at the site 100 that are metered by the meter 104. Thus, the loads 108, 110, 112 are individually labeled load 1 108, load 2 110, and load n 112 to show that a plurality of loads (e.g., n loads) may be operated at the site 100 and connected to the panel 106.

A consumption management system (CMS) 114 is diagrammatically shown in FIG. 1 as well. The CMS 114 may comprise multiple components, such as, for example, a controller 116 or other computer control system, an energy storage and/or generation system (ESS) 118, and an inverter and/or converter system 120 connecting the ESS 118 to the panel 106. The controller 116 may be connected to a network 122 (e.g., a local area network (LAN), wide area network (WAN), or the Internet) through an external connection.

The ESS 118 may comprise one or more of a battery system (i.e., an electrical energy storage battery) and/or a generator system. The ESS 118 may therefore be a source of electrical energy that may be used by loads 108, 110, 112 at the site 100 when consumption of the energy of the ESS 118 is permitted by the controller 116. The ESS 118 may have specifications such as a battery capacity (e.g., in kilowatt-hours (kWh)), battery voltage, battery current, state of charge, and other characteristics. Typically, the price of the ESS 118 is directly related to its storage capacity. Thus, the present systems and methods may beneficially help the customer determine a battery capacity that is likely to provide sufficient energy for the CMS 114 to manage consumption at the site's setpoint without having wasteful excess capacity that is unlikely to be needed. When possible, the ESS 118 may be charged by the utility grid connection 102 by drawing power through the meter 104 and may be controlled to discharge energy to the panel 106 generally, to loads 108, 110, 112 individually or in groups, or to the utility grid connection 102 specifically. Typically, the CMS 114 is used for peak or consumption spike mitigation purposes, and for that function the ESS 118 may provide power to the loads 108, 110, 112 or panel 106 in order to prevent the meter 104 from recording consumption of the site that exceeds a threshold that may be referred to as a "setpoint" for the CMS 114. When energy from the ESS 118 is used by the loads 108, 110, 112, the meter 104 records less energy being drawn from the utility grid connection 102, so the registered "peak" in consumption is eliminated or reduced.

Many utility service providers assess peak demand charges based on the highest average consumption recorded over a relatively short period of time that is a subdivision of a billing period. For example, a peak demand charge may be based on the highest average metered power draw of the customer over 15 minutes out of all of the 15-minute periods in the billing cycle. Other utility providers may assess peak demand charges based on the highest instantaneous power draw of a customer at any time during a billing period. Thus, operation of the systems and methods disclosed herein may be adapted and configured to manage consumption of the customer in a manner that corresponds with the practices of the utility provider. This differs from a "peak" defined by utility providers that refers to "peak hours" of the day or "peak seasons" in which prices for energy are higher than other times. A peak demand charge, as defined herein, may be based on a spike or peak in demand that occurs during "peak hours" or a "peak season," but the peak demand charge is determined based on the magnitude of the peak or the magnitude of the average of the peak subdivision of the billing period rather than being based on the time of day or year when it occurs.

Referring again to FIG. 1, the inverter and/or converter system 120 may comprise electronics configured to connect the ESS 118 to the electrical panel 106 and or other electrical interfaces at the site 100. Thus, the inverter and/or converter system 120 may adapt the output of the ESS 118 for providing energy to the panel 106 or other interfaces at the site 100. The inverter and/or converter system 120 may therefore comprise inverters such as AC-DC or DC-AC inverters, converters such as DC-DC converters, step-up or step-down converters, and related conversion equipment. The inverter and/or converter system 120 may also comprise specifications such as a minimum and maximum power output or rate of energy transfer from the ESS 118. Usually, the cost of an inverter or converter is proportional to its maximum conversion rate (e.g., in kilowatts (kW)).

The controller 116 may be a computer system configured to receive information from the meter 104, loads 108, 110, 112, ESS 118, inverter and/or converter system 120, and/or a network connection 122. The controller 116 may monitor the metered load of the site to determine when to discharge the ESS 118 via the inverter and/or converter system 120 to prevent the metered load from exceeding a desired peak consumption rate during a billing cycle. To do so, the controller 116 may be programmed to predict future consumption of the site in order to improve the cost-effectiveness of discharge events. For example, a controller 116 may control discharging the ESS 118 with respect to the state of charge of the ESS 118 so that the state of charge of the ESS 118 does not drop so low that an expected upcoming peak is not unmitigated by the CMS 114.

Figure 2:
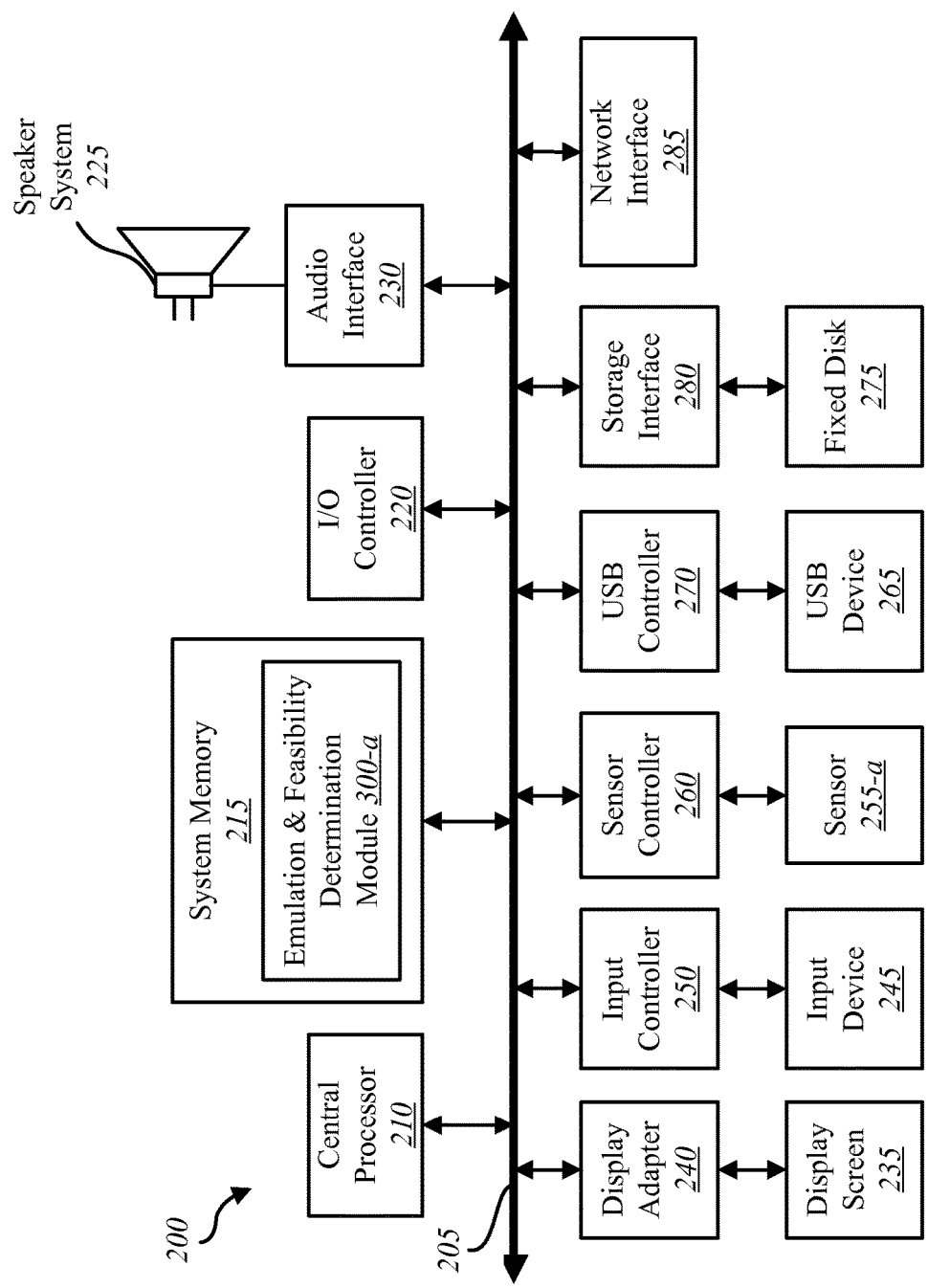
FIG. 2 is a block diagram of a computer system that may be used to implement various aspects of the present disclosure.

FIG. 2 is a block diagram of a computer system 200 that may be used to implement a system controller of the present disclosure such as controller 116 of FIG. 1 or to implement a computer for calculating feasibility of an electrical energy consumption management system for an energy consumer. Computer system 200 includes a bus 205 which interconnects major subsystems of computer system 200, such as a central processor 210, a system memory 215 (typically RAM, but which may also include ROM, flash RAM, or the like), an input/output controller 220, an external audio device, such as a speaker system 225 via an audio output interface 230, an external device, such as a display screen 235 via display adapter 240, an input device 245 (e.g., a keyboard, touchscreen, etc.) (interfaced with an input controller 250), a sensor 255-a (interfaced with a sensor controller 260), one or more universal serial bus (USB) device 265 (interfaced with a USB controller 260), and a storage interface 280 linking to a fixed disk 275. A network interface 285 is also included and coupled directly to bus 205.

Bus 205 allows data communication between central processor 210 and system memory 215, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output System (BIOS) which controls basic hardware operation such as the interaction with peripheral components or devices. For example, computer-readable instructions of a system emulation and feasibility determination module 300-a which may implement the present systems and methods may be stored within the system memory 215. Applications resident with computer system 200 are generally stored on and accessed via a non-transitory computer readable medium, such as a hard disk drive (e.g., fixed disk 275), an optical drive (e.g., an optical drive that is part of a USB device 265 or that connects to storage interface 280), or other storage medium. Additionally, applications can be in the form of electronic signals modulated in accordance with application and data communication technology when accessed via network interface 285.

Storage interface 280, as with the other storage interfaces of computer system 200, can connect to a standard computer readable medium for storage and/or retrieval of information, such as a fixed disk drive 275. Fixed disk drive 275 may be a part of computer system 200 or may be separate and accessed through other interface systems. A modem connected to the network interface 285 may provide a direct connection to a remote server via a telephone link or to the Internet via an internet service provider (ISP). Network interface 285 may provide a direct connection to a remote server via a direct network link to the Internet via a POP (point of presence). Network interface 285 may provide such connection using wireless techniques, including digital cellular telephone connection, Cellular Digital Packet Data (CDPD) connection, digital satellite data connection or the like. In some embodiments, network interface 285 may connect to the network connection 122 of FIG. 1.

Many other devices or subsystems (not shown) may be connected in a similar manner (e.g., document scanners, digital cameras and so on). Conversely, all of the devices shown in FIG. 2 need not be present to practice the present systems and methods. The devices and subsystems can be interconnected in different ways from that shown in FIG. 2. The operation of a computer system such as that shown in FIG. 2 is readily known in the art and is not discussed in detail in this application. Code to implement the present disclosure can be stored in a non-transitory computer-readable medium such as one or more of system memory 215, or fixed disk 275. The operating system provided on computer system 200 may be MS-DOS®, MS-WINDOWS®, OS/2®, UNIX®, MAC OS X®, Linux®, or another known operating system.

Figure 3:
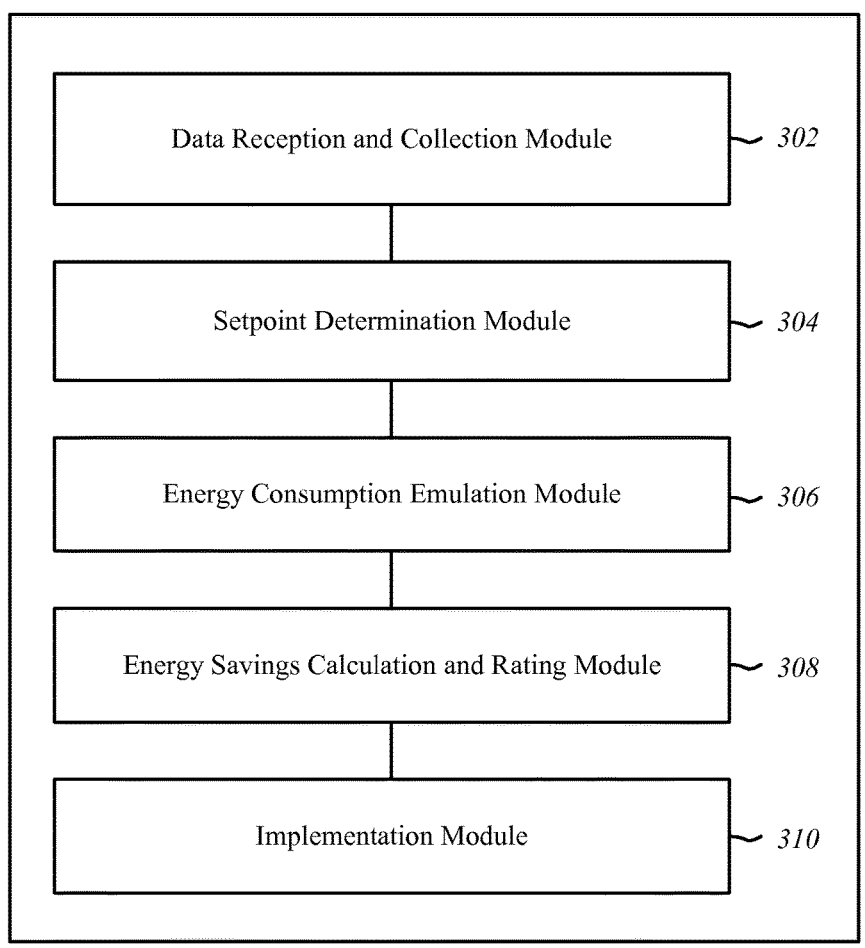
FIG. 3 is a block diagram of a module that may be used to implement various aspects of the present disclosure.

A system emulation and feasibility determination module 300-b is diagrammatically shown in FIG. 3. The system emulation and feasibility determination module 300-b may comprise a plurality of individual submodules which may be embodied as software instructions to be implemented by computer system 200 or another computer system of the present disclosure. Individual submodules of the system emulation and feasibility determination module 300-b may include a data reception and collection module 302, a setpoint determination module 304, an energy consumption emulation module 306, an energy savings calculation and rating module 308, and/or an implementation module 310.

A data reception and collection module 302 may be used to collect, receive, or retrieve data about a customer site (e.g., site 100). The data may include, for example, a historical electricity consumption load profile of the site. A "load profile" as used herein may be defined as a recording of the consumption rate of the site over time. When a load profile is collected, the consumption of the site is recorded and matched to the time that the consumption takes place. In order to receive or collect a load profile, the data reception and collection module 302 may be connected to one or more sensors 255-*b* (see FIG. 1), such as an ammeter or voltmeter, to measure the consumption of the site. The sensor 255-*b* may be connected to loads 108, 110, 112, the panel 106, the meter 104, or other electronics at the site to obtain a load profile. In some embodiments the load profile collected may reflect the consumption of the site as a whole so that the CMS can be designed to manage consumption of the site as a whole. In other embodiments, certain loads may be separated or independent from the utility grid connection 102, and the load profile may only reflect consumption of the metered loads.

In some arrangements, the data reception and collection module 302 may receive a pre-recorded load profile rather than retrieving an existing load profile. This may be advantageous because hardware such as sensor 255-*b* may not need to be installed in advance at a consumer's site, and the pre-recorded load profile may provide information about a large number of load configurations and historical load changes at the site that would take a long time to gather by a newly-installed sensor 255-*b*. The pre-recorded load profile may be collected from the consumer's records or from recordings made by the utility provider or another party.

The system emulation and feasibility determination module 300-*b* may also comprise a setpoint determination module 304. The setpoint determination module 304 may implement software configured to analyze and assess a load profile produced by the data reception and collection module 302 in order to determine a setpoint for a CMS that may be installed at the site. This process may include receiving hardware specifications of the CMS that may be installed, such as, for example, an ESS capacity and an inverter conversion capacity. Using the load profile data, the setpoint determination module 304 may detect the magnitude of the customer's demand during peaks and lulls in the demand of the customer. The module 304 may also detect patterns marking the occurrence of peaks or lulls in the demand of the customer. Using this information, the module 304 may determine, for a given amount of energy storage and inverter conversion capacity, a maximum demand value that the customer can be prevented from exceeding through the use of the CMS under conditions represented by the load profile. This maximum demand value may be referred to as the "setpoint" of the site for that particular CMS under the conditions represented by the load profile.

In a simplified example, the setpoint determination module 304 may detect that in a certain 15-minute period the load profile has a spike in consumption of 20 kW that lasts 2 minutes followed by a lull in consumption to 10 kW that lasts 2 minutes. The module 304 may therefore determine a setpoint for the CMS of 15 kW, which means that the CMS will discharge at 5 kW for 2 minutes when the spike occurs and will recharge at 5 kW for 2 minutes when the lull occurs. Accordingly, the metered consumption recorded by the utility provider will not exceed 15 kW due to the discharge of the CMS canceling out a portion of the spike in consumption. Accordingly, because the load does not exceed the setpoint value but instead is held level at that value rather than exceeding it, the CMS may be referred to as a load leveling system. The energy stored by the CMS may also be sustained after the mitigation action due to the recharging action and because the energy storage is recharged during a lull in consumption, the recorded peak in consumption is not driven over the 15 kW setpoint due to additional draw from the utility grid needed to recharge the CMS.

In some cases, the setpoint determined by the setpoint determination module 304 may be affected by the overall energy storage capacity of the CMS since the energy storage may not be able to provide energy needed to keep a certain spike or plateau in energy consumption from exceeding the setpoint. Thus, the setpoint may be set to a value wherein the energy storage capacity is expected to be able to provide sufficient energy to prevent this from happening. Similarly, the setpoint may be affected by the maximum energy conversion rate of the inverter or converter system at the site since the CMS may only be capable of reducing the magnitude of a peak by an amount equal to the maximum energy conversion rate. Thus, the setpoint may be determined to be at least as high as the maximum magnitude of the load profile minus the maximum energy conversion rate of the inverter or converter system.

The system emulation and feasibility determination module 300-*b* may also comprise an energy consumption emulation module 306. The energy consumption emulation module 306 may implement software that emulates operation of the CMS over a period of time using a historical load profile obtained by module 302, the setpoint determined by module 304, and the CMS specifications for that setpoint. The energy consumption emulation module 306 may simulate operation of the CMS over a portion of the historical load profile that was not used to generate the setpoint so that the simulation of the CMS is more accurate to real-world conditions wherein the CMS may experience unexpected increases and decreases in consumption that would lead to inefficiencies in the operation of the CMS. In this way, the emulated operation of the CMS may be subject to testing that would otherwise take place after being implemented at a customer's site, but the testing may provide feedback before the CMS components are purchased, installed, and other expenses are incurred at the time of implementation. Moreover, if the CMS does not produce desired results in its emulated operation (e.g., does not reduce peak demand charges by enough of a margin or flaws in the design of the CMS arise), the CMS may be reconfigured in advance to avoid needing future modification after installation.

In an example embodiment, the energy consumption emulation module 306 may operate by simulating what the optimal energy cost reduction would be with a given CMS using the assumption that the CMS operated perfectly over the second time period. This, however, gives ideal results rather than real-world emulation. To better simulate real-world operation of a CMS, the energy consumption emulation module 306 may emulate operation of the CMS while incrementally providing recorded load profile data of the second time period to the emulated CMS. In real-world conditions, the CMS receives data incrementally in this manner, so its operation is more realistically gauged by this process.

The energy savings calculation and rating module 308 may be implemented to gauge the effectiveness and feasibility of implementing the CMS at the customer site. In an example embodiment, the energy savings calculation and rating module 308 may determine what the peak demand charge would be if there is no CMS implemented at the site (i.e., an unmodified site). The module 308 may also determine what the peak demand charge would be if the CMS was implemented at the site using the results of the emulated operation of the CMS that are produced by the energy consumption emulation module 306. The unmodified peak demand charge and modified peak demand charge may be compared by the energy savings calculation and rating module 308 to obtain a value that represents the energy cost savings that would have been produced by the CMS if it was implemented at the site. For example, the CMS-modified peak demand charge may be subtracted from the unmodified peak demand charge to obtain a net savings that would have been produced by the CMS. The customer may then use this result to make determinations about whether the CMS should be implemented or whether modifications to the CMS would be necessary. In some arrangements, the energy savings calculation and rating module 308 may determine energy savings that would be produced by multiple different CMS configurations or specifications and compute differences in the energy savings that would be produced by each different CMS.

In some embodiments, the energy savings calculation and rating module 308 may also be used to rate the feasibility of the CMS for the customer. The feasibility of a CMS may be based on a rating value such as a ratio of the cost of implementing the CMS to the calculated expected savings obtained by implementing the CMS. The cost of implementing the CMS may include costs such as the cost of parts, installation, delivery, maintenance, etc. A rating value may provide a numerical comparison tool for objectively evaluating different CMS configurations. For example, the energy savings calculation and rating module 308 may determine a rating value for two different CMS configurations and compare them to each other. A consumer may implement a CMS that has a rating that fits within a target range, such as a rating that has at least about a 30 to 1 implementation cost to monthly savings ratio. In another example, the consumer may identify a CMS that has the best cost to savings ratio that has an implementation cost less than or equal to a target value.

The system emulation and feasibility determination module 300-b may also comprise an implementation module 310. The implementation module 310 may comprise software instructions configured to implement a CMS at a site, such as, for example, by adjusting the setpoint of a CMS at the site, adjusting the settings of an inverter at the site (e.g., increasing or decreasing the maximum output of the inverter), controlling whether energy storage at the site is connected to the site or not, or other actions.

Figure 4:
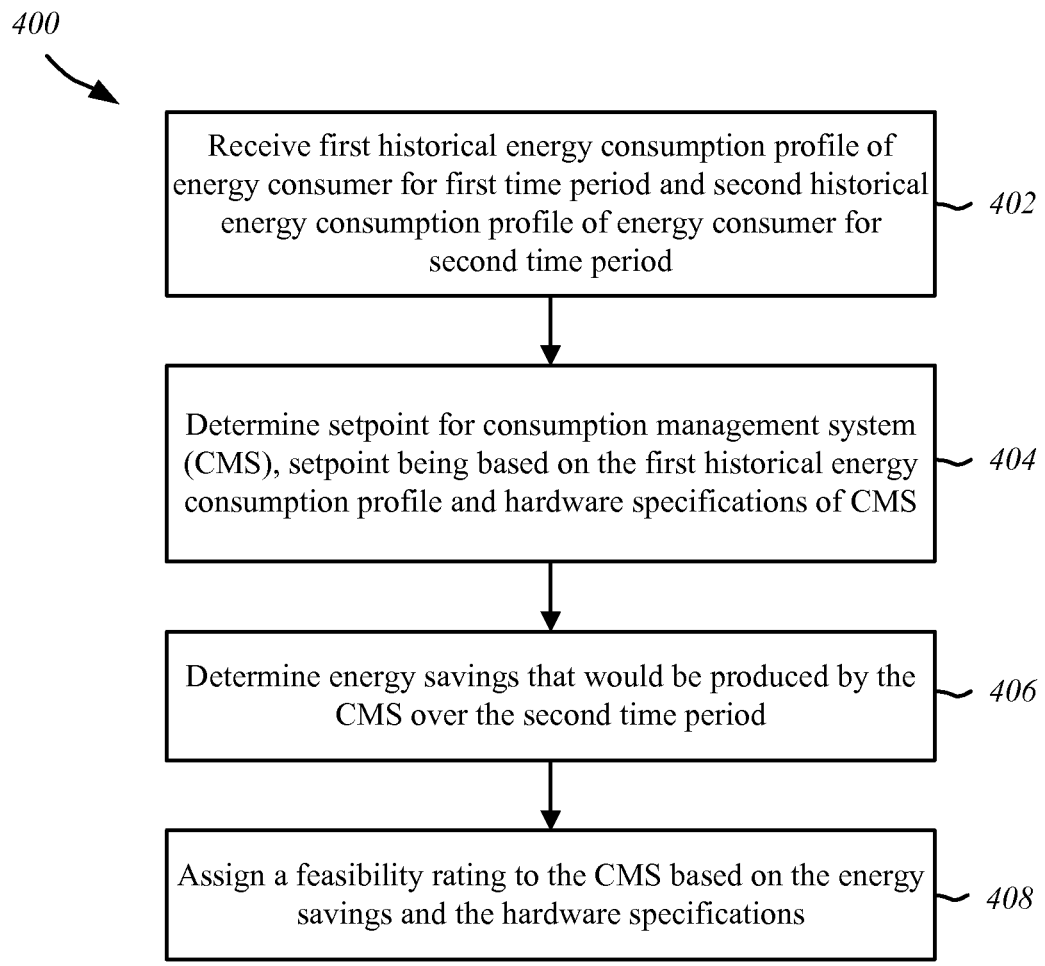
FIG. 4 is a process flowchart illustrating an example embodiment of the systems and methods of the present disclosure.

FIG. 4 shows a flowchart illustrating one embodiment of a process 400 for calculating feasibility of an electrical energy consumption management system (CMS) for an energy consumer. The process 400 may be implemented using the system emulation and feasibility determination module 300-b of FIG. 3. In block 402, the process includes receiving a first historical energy consumption profile of energy consumer for a first time period and a second historical energy consumption profile of energy consumer for a second time period. The first time period may precede the second time period. This block 402 may be performed by a data reception and collection module 302.

In block 404, the process 400 includes determining a setpoint for the consumption management system (CMS), wherein the setpoint is based on the first historical energy consumption profile and hardware specifications of CMS. This block 404 may be performed by a setpoint determination module 304. The hardware specifications of the CMS may comprise the capacity of energy storage or power converters in the CMS. The hardware specifications may also include the costs of the system, including costs of purchase, installation, delivery, maintenance, and/or other related costs.

Next, in block 406, the process 400 may include determining energy savings that would be produced by the CMS over the second time period. This may require performance of emulation of the CMS over the second time period using an energy consumption emulation module 306 and then analysis of that emulation by an energy savings calculation and rating module 308 to obtain the energy savings that would be produced over the second time period.

Block 408 of the process may include assigning a feasibility rating to the CMS based on the energy savings and the hardware specifications of the CMS. For example, this block 408 may be performed by the energy savings calculation and rating module 308 of FIG. 3 to assign a feasibility rating to the CMS (e.g., a cost to savings produced ratio for the CMS or a binary go/no-go assessment of viability for the customer or financier of the CMS). See also blocks 510-512 in FIG. 5.

Figure 5:
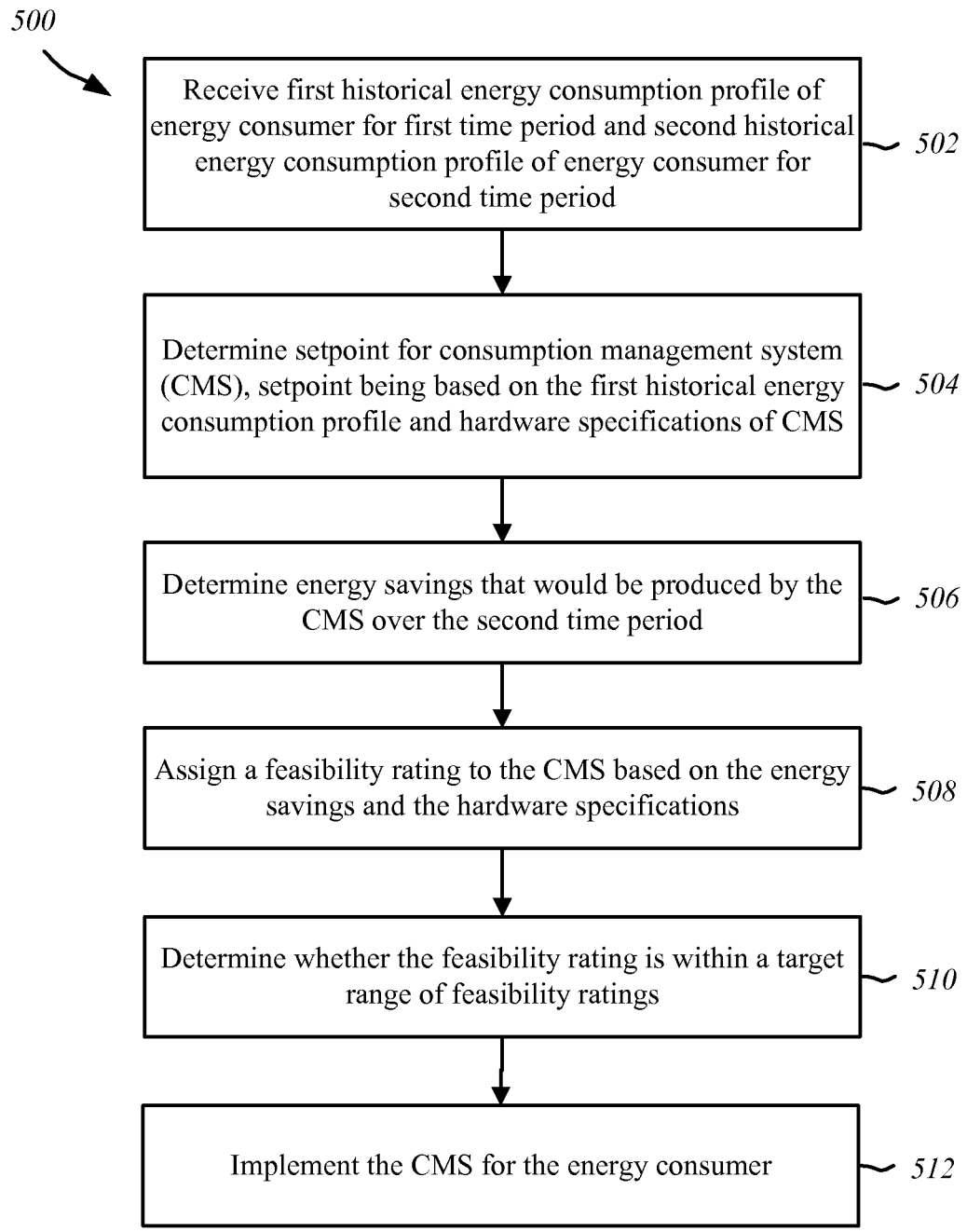
FIG. 5 is another process flowchart illustrating an example embodiment of the systems and methods of the present disclosure.

FIG. 5 shows another process 500 for calculating feasibility of an electrical energy consumption management system (CMS) for an energy consumer. Blocks 502, 504, 506, and 508 may be performed substantially the same as blocks 402 through 408 described above. In block 510, the process 500 may include determining whether the feasibility rating assigned to the CMS in block 508 is within a target range of feasibility ratings. For example, the feasibility of implementing the CMS may be linked to whether the feasibility rating lies within a target range (e.g., is high enough or low enough to justify implementation by the customer). For a feasibility rating that includes a ratio, the target range may comprise an upper and/or lower bound that defines the acceptable range of feasibility rating ratios. The feasibility rating of the CMS may also be binary, such as whether or not the CMS is capable of a target range of energy savings values or whether or not the CMS can provide energy savings while being within a target range of viable costs of the CMS. Thus, in block 510, the process 500 may simply determine whether or not the binary result is affirmative or negative.

The process 500 may also include block 512 which includes implementing the CMS for the energy consumer. Implementation may take place through operation of a specialized computer or via software, as discussed above in connection with implementation module 310. In some embodiments, implementing the CMS for the energy consumer may comprise obtaining the CMS having the hardware specifications and setpoint settings used in block 504 and installing the CMS for the energy consumer by physically connecting the electrical components of the CMS to the consumer's site. In other cases, implementing the CMS for the energy consumer may comprise providing instructions to the consumer regarding the hardware that should be used in a CMS implemented by the consumer.

Figure 6:
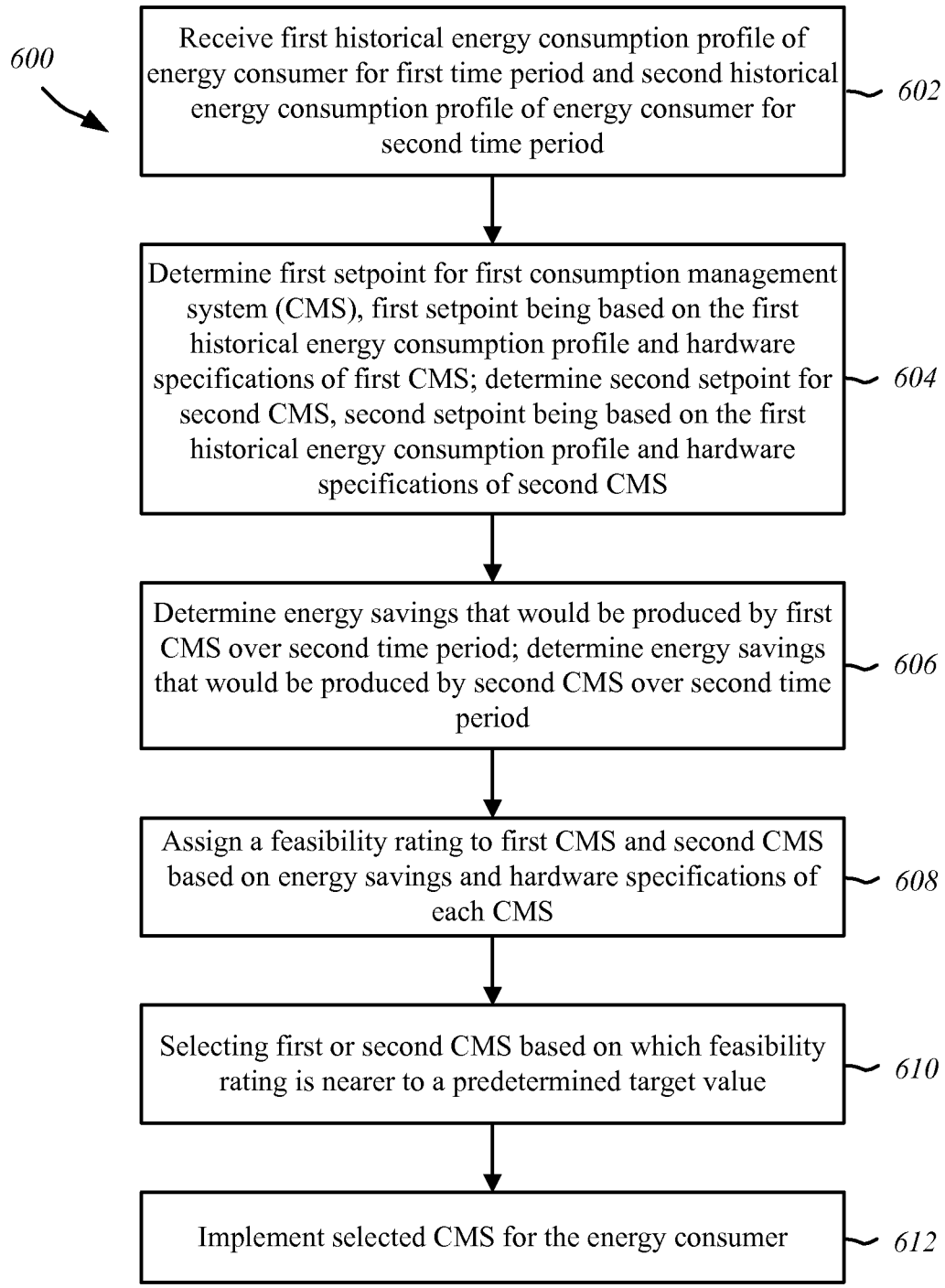
FIG. 6 is another process flowchart illustrating an example embodiment of the systems and methods of the present disclosure.

FIG. 6 shows a process 600 illustrating other aspects of the present disclosure. In block 602, the process 600 comprises receiving a first historical energy consumption profile of an energy consumer for a first time period and a second historical energy consumption profile of the energy consumer for a second time period. This mirrors blocks 402 and 502 and may be implemented in the same way. In block 604, the process 600 may include determining a first setpoint for a first CMS, the first setpoint being based on the first historical energy consumption profile and hardware specifications of the first CMS, and determining a second setpoint for a second CMS, the second setpoint being based on the first historical energy consumption profile and the hardware specifications of the second CMS. The operation of block 604 may follow the operation of block 404, but with the setpoint determination being performed independently for two different and distinct CMS configurations.

In block 606, the process 600 may include determining an energy savings that would be produced by the first CMS over the second time period and determining the energy savings that would be produced by the second CMS over the second time period. This may entail operating an energy consumption emulation module 306 and energy savings calculation and rating module 308 for the first and second CMS configurations to obtain different energy savings values for each CMS that would be produced if they were each individually and separately operated over the second time period.

Next, block 608 may include assigning a feasibility rating to the first CMS and assigning a feasibility rating to the second CMS based on the energy savings and hardware specifications of each CMS. The energy savings calculation and rating module 308 may be used to complete this task for each CMS to obtain a separate feasibility rating for each of the first and second CMS. Using these feasibility ratings, block 610 may include selecting the first or second CMS based on which feasibility rating is nearer to a predetermined target value. For example, the first or second feasibility rating may be selected based on which of the two is nearer to zero or nearer to infinity. If the feasibility rating is a binary rating, this block 610 may be performed to select which of the CMS configurations passes the criteria and has a positive (or, in some embodiments, a negative) rating. In some arrangements the feasibility rating may be expressed as a number between zero and one, so block 610 may be performed to select which of the two CMS configurations has a feasibility rating closer to zero (or one). For example, in some cases the feasibility rating may be obtained by determining a cost of energy at the site with an emulated CMS operating and dividing that cost by the cost of energy that would be charged to the customer without any CMS operating at the site. This value will lie between zero and one as an efficiency ratio. Thus, block 610 may include selecting which CMS would provide the best value to the customer.

Finally, block 612 of the process 600 may include implementing the selected CMS for the energy consumer. The selected CMS in this situation is the CMS that is selected in block 610 due to having a feasibility rating that is nearer to the predetermined target value. Implementing the CMS in block 612 may mirror the actions taken in the operation of block 512, which are described above, or by the implementation module 310, which are also described above.

In various embodiments disclosed herein, the utility provider may specify certain billing rules using a tariff or schedule. The tariff may be used to determine what the utility provider will charge for power at certain times and for certain magnitudes of demand that are registered for peak demand charges.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

What is claimed is:

1. A process for calculating feasibility of an electrical energy consumption management system for an energy consumer, the process comprising:
   receiving, at a controller, a first historical energy consumption profile of an energy consumer for a first time period and a second historical energy consumption profile of the energy consumer for a second time period, the second time period being after the first time period;
   determining, using the controller, a first setpoint for a first consumption management system, wherein the first consumption management system has first hardware specifications, wherein the first hardware specifications comprise a physical characteristic of the first consumption management system, and wherein the first setpoint is based on the first historical energy consumption profile and the first hardware specifications;
   determining, using the controller, a first energy savings that would be produced by the first consumption management system over the second time period using the first setpoint by emulating operation of the first consumption management system over the second time period using the second historical energy consumption profile and determining a reduction in energy usage over the second time period under emulated operation of the first consumption management system;
   assigning, using the controller, a first feasibility rating to the first consumption management system based on the first energy savings and the first hardware specifications.

2. The process of claim 1, wherein the first feasibility rating comprises a ratio of the first energy savings to the first hardware specifications.

3. The process of claim 2, wherein the first hardware specifications comprise a cost of the first consumption management system and the first energy savings comprise a value of energy saved by operation of the first consumption management system over the second time period.

4. The process of claim 1, further comprising:
   determining whether the first feasibility rating is within a target range of feasibility ratings;
   responsive to determining that the first feasibility rating is within the target range, implementing the first consumption management system for the energy consumer.

5. The process of claim 1, further comprising:
   determining a second setpoint for a second consumption management system, wherein the second management system has second hardware specifications, and wherein the second setpoint is based on the first historical energy consumption profile and the second hardware specifications;
   determining a second energy savings that would be produced by the second consumption management system over the second time period using the second setpoint;
   assigning a second feasibility rating to the second consumption management system based on the second energy savings and the second hardware specifications;
   selecting the first or second consumption management system based on which of the first and second feasibility ratings is nearer to a target value.

6. The process of claim 5, further comprising:
   determining whether the selected first or second consumption management system has a selected-system feasibility rating within a target range of feasibility ratings;
   responsive to determining that the selected-system feasibility rating is within the target range, implementing the selected consumption management system for the energy consumer.

7. The process of claim 6, further comprising:
   responsive to determining that the selected-system feasibility rating is not within the target range, changing the first hardware specifications.

8. The process of claim 1, wherein the first hardware specifications comprise at least one of: an energy storage capacity and a power conversion capacity.

9. A computing device configured for calculating feasibility of an electrical energy consumption management system for an energy consumer, the computing device comprising:
   a processor;
   memory in electronic communication with the processor, wherein the memory stores computer executable instructions that, when executed by the processor, cause the processor to:
   receive a first historical energy consumption profile of an energy consumer for a first time period and a second historical energy consumption profile of the energy consumer for a second time period, the second time period being after the first time period;
   determine a first setpoint for a first consumption management system, wherein the first consumption management system has first hardware specifications, the first hardware specifications comprising at least a physical characteristic of the first consumption management system, and wherein the first setpoint is based on the first historical energy consumption profile and the first hardware specifications;
   determine a first energy savings that would be produced by the first consumption management system over the second time period using the first setpoint by emulating operation of the first consumption management system over the second time period using the second historical energy consumption profile and determining a reduction in energy usage over the second time period under emulated operation of the first consumption management system;
   assign a first feasibility rating to the first consumption management system based on the first energy savings and the first hardware specifications.

10. The computing device of claim 9, wherein the computer executable instructions further cause the processor to:
    determine a second setpoint for a second consumption management system, wherein the second management system has second hardware specifications, and wherein the second setpoint is based on the first historical energy consumption profile and the second hardware specifications;
    determine a second energy savings that would be produced by the second consumption management system over the second time period using the second setpoint;
    assign a second feasibility rating to the second consumption management system based on the second energy savings and the second hardware specifications;
    select the first or second consumption management system based on which of the first and second feasibility ratings is nearer to a predetermined target value.

11. The computing device of claim 10, wherein the computer executable instructions further cause the processor to:
    determine whether the selected first or second consumption management system has a selected-system feasibility rating within a target range of feasibility ratings;
    responsive to determining that the selected-system feasibility rating is within the target range, implementing the selected consumption management system for the energy consumer.

12. The computing device of claim 11, wherein the computer executable instructions further cause the processor to:
    responsive to determining that the selected-system feasibility rating is not within the target range, change the first hardware specifications.

13. The computing device of claim 10, wherein the first feasibility rating comprises a ratio of the first energy savings to the first hardware specifications.

14. A non-transitory computer-readable storage medium storing computer executable instructions that, when executed by a processor, cause the processor to perform the steps of:
    receiving a first historical energy consumption profile of an energy consumer for a first time period and a second historical energy consumption profile of the energy consumer for a second time period, the second time period being after the first time period;
    determining a first setpoint for a first consumption management system, wherein the first consumption management system has first hardware specifications, wherein the first hardware specifications comprise a capacity of the first consumption management system, and wherein the first setpoint is based on the first historical energy consumption profile and the first hardware specifications;
    determining a first energy savings that would be produced by the first consumption management system over the second time period using the first setpoint by emulating operation of the first consumption management system over the second time period using the second historical energy consumption profile and determining a reduction in energy usage over the second time period under emulated operation of the first consumption management system;
    assigning a first feasibility rating to the first consumption management system based on the first energy savings and the first hardware specifications.

15. The non-transitory computer-readable storage medium of claim 14, wherein the computer executable instructions further comprise:
    determining a second setpoint for a second consumption management system, wherein the second management system has second hardware specifications, and wherein the second setpoint is based on the first historical energy consumption profile and the second hardware specifications;
    determining a second energy savings that would be produced by the second consumption management system over the second time period using the second setpoint;
    assigning a second feasibility rating to the second consumption management system based on the second energy savings and the second hardware specifications;
    selecting the first or second consumption management system based on which of the first and second feasibility ratings is nearer to a predetermined target value.

16. The non-transitory computer-readable storage medium of claim 14, wherein the computer executable instructions further comprise:
- determining whether the selected first or second consumption management system has a selected-system feasibility rating within a target range of feasibility ratings;
- responsive to determining that the selected-system feasibility rating is within the target range, implementing the selected consumption management system for the energy consumer.

17. The non-transitory computer-readable storage medium of claim 16, wherein the computer executable instructions further comprise:
- responsive to determining that the selected-system feasibility rating is not within the target range, changing the first hardware specifications.

18. The non-transitory computer-readable storage medium of claim 14, wherein the first feasibility rating comprises a ratio of the first energy savings to the first hardware specifications.

\* \* \* \* \*